United States Patent Office 3,302,657
Patented Feb. 7, 1967

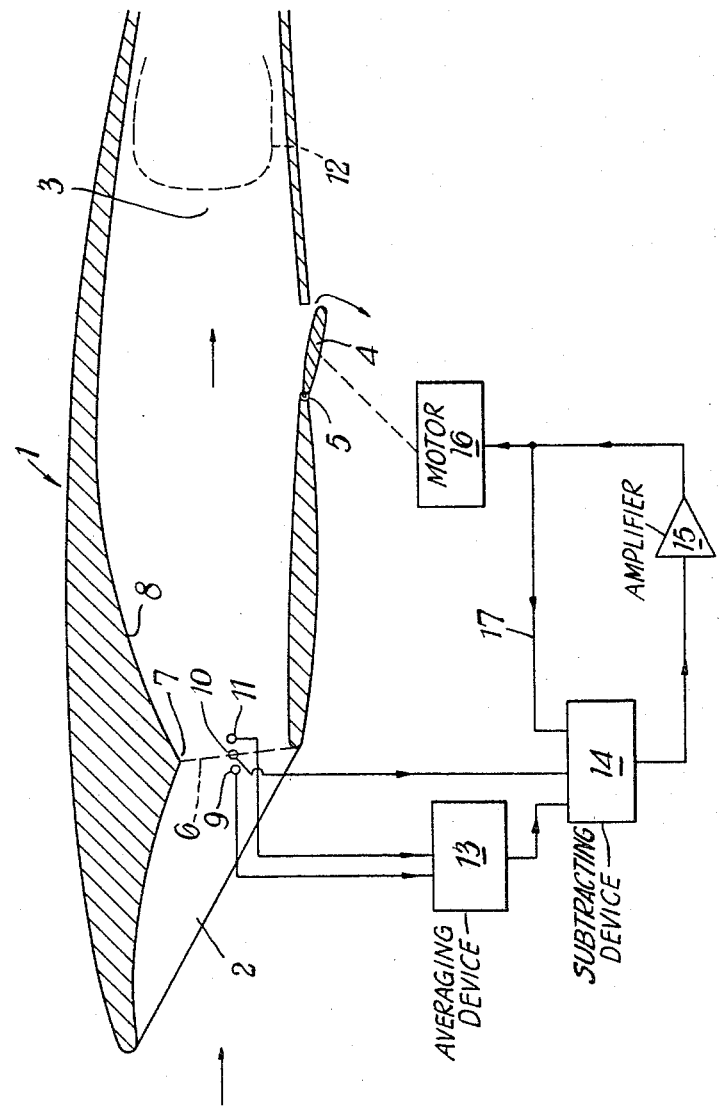

3,302,657
CONTROL OF A GAS FLOW AS A FUNCTION OF THE POSITION OF A STANDING SHOCK WAVE IN THE GAS
Leslie Bullock, Ware, England, assignor to Hawker Siddeley Dynamics Limited, a company of Great Britain
Filed Jan. 8, 1965, Ser. No. 424,378
Claims priority, application Great Britain, Jan. 14, 1964, 1,621/64
10 Claims. (Cl. 137—15.2)

This invention relates to the control of the flow of a gas relatively to an object past which the gas is flowing, the flow of the gas being at least partly supersonic and such that at least one standing shock-wave is set up in the gas in the neighbourhood of the object, the position of that shock-wave relatively to the object varying as a function of the flow of the gas relatively to the object, the flow of the gas relatively to the object being controlled in accordance with the position of the shock-wave relatively to the object in order to obtain a desired flow of the gas relatively to the object.

It is known to measure the pressure of the air flowing through the air intake of an aircraft engine, in order to detect the position of a standing shock-wave in the air in or adjacent to the air intake, and to control the flow of the air through the air intake in accordance with such pressure measurement, in order to maintain the shock-wave in a fixed position relatively to the air intake and thereby to maintain a predetermined flow of the air to the engine.

According to the invention, there is provided, in combination with a body capable of moving at supersonic speed relative to an adjacent gaseous atmosphere to generate a standing shock-wave relative to the body and in the gaseous atmosphere, temperature-sensitive means carried by the body to derive an error signal as a function of the departure of the shock-wave relative to the body from a desired position, and control means responsive to the said error signal to modify the gas flow relative to the body in the sense to reduce the said departure.

Preferably, the temperature-sensitive means comprises at least three temperature-sensitive elements one of which is located substantially at the desired position of the shock-wave, at least one other of which is located at one side of the desired position of the shock-wave, and at least one other of which is located at the other side of the desired position of the shock-wave.

Conveniently, the temperature-sensitive elements are arranged in a row, so as to extend across the desired position of the shock-wave in the direction of flow of the gas.

The control means may be arranged to compare the outputs of the said other temperature-sensitive elements with the output of the said one temperature-sensitive element, and to modify the flow of the gas relatively to the body in response to such comparison.

The gas may be air.

The apparatus may be arranged to control the flow of the gas to or from an engine. In such case, the flow of the gas to or from the engine may be by way of a duct provided with flow-modifying means operable to control the flow of the gas to or from the engine, the flow-modifying means being controlled by the control means. Where this is so, the temperature-sensitive element or elements may be located within or adjacent to the duct.

The invention also extends to an engine provided with apparatus according to the invention and arranged for controlling the flow of gas to or from the engine.

The invention further extends to an aircraft provided with apparatus according to the invention and arranged for controlling the flow of the gas to or from an engine of the aircraft.

According to one specific embodiment of the invention, there is provided apparatus for controlling the flow of air to an engine of an aircraft, the engine being supplied with air from the atmosphere through a duct provided with a variable aperture through which air can escape from the duct, the flow of air adjacent to and/or within the duct being at least partly supersonic and such that at least one standing shock-wave is set up in the air adjacent to and/or within the duct, the position of that shock-wave relatively to the duct being a function of the flow of air to the aircraft engine, the apparatus including at least one temperature-sensitive element the output of which is an electrical signal which is a function of the temperature of the gas at or near a desired position of the shock-wave relatively to the duct, that position corresponding to a desired flow of air to the aircraft engine, and control means responsive to the electrical signal to control the escape of air from the duct by means of the variable aperture and thereby modify the flow of air to the aircraft engine until the shock-wave reaches the desired position.

One embodiment of the invention will now be described by way of example, reference being made to the accompanying drawing which is a longitudinal cross-section of an inlet duct through which air is supplied from the atmosphere to a gas-turbine engine of an aircraft capable of travelling at supersonic speeds.

The duct 1 is of generally rectangular cross-section in the present case, but may in certain cases be of some other cross-section. Air from the atmosphere enters the duct at its inlet end 2 which, as shown in the drawing, is cut away at an angle of approximately 45°. Such air passes through the duct, in the direction from left to right as shown in the drawing, towards the outlet end 3 of the duct. Air which reaches the outlet end 3 of the duct passes to the compressor 12 of the engine, but some of the air which enters the inlet end 2 of the duct may be permitted to escape to the atmosphere by way of a variable aperture formed in the duct. This aperture may have any convenient form, but is shown in the drawing as having the form of a vent 4 pivotally movable about an axis 5 and located adjacent to the outlet end 3 of the duct.

When the aircraft concerned is travelling at or near supersonic speeds, the flow of the air into and through the duct and thence to the engine may be at least partly supersonic, by which is meant that the velocity, relative to the duct, of at least some portions of the air in the neighborhood of the duct equals or exceeds the speed of sound in those portions of the air, due regard being taken of the physical parameters of those portions of the air. Where such supersonic conditions are attained, the flow of the air may be such that at least one standing shock-wave it set up, in the air, adjacent to and/or within the duct. The nature of such a shock-wave is not fully understood, but the presence of a shock-wave in the air is associated with the presence of discontinuities of certain physical parameters of the air; in particular, the pressure and the temperature of the air change relatively abruptly, in the neighborhood of a shock-wave. The expression "standing" shock-wave is employed here to refer to a shock-wave which is not propagated past the duct, but the position of which relatively to the duct varies as a function of the flow of the air relatively to the duct.

Thus, when the aircraft concerned is travelling at or near supersonic speeds, at least one such standing shock-wave may be set up in the air adjacent to and/or within the duct. It is found that the position of such a shock-wave is a function of the flow of the air relatively to the duct and, in particular, is a function of the flow of the air from the outlet end 3 of the duct to the compressor 12 of the engine. Thus, it is possible to maintain a desired flow of the air, from the outlet end 3 of the duct to the compressor of the engine, by maintaining constant the position of the standing shock-wave relatively to the duct.

More particularly, in the aircraft concerned, air from the outlet end 3 of the duct 1 is supplied to the compressor 12 of the gas-turbine engine of the aircraft, and it is required to ensure that the flow of the air at the entry of the compressor 12 is not supersonic, so that the efficiency of the engine is not thereby reduced. This, it is found, can be done by maintaining constant the position of the standing shock-wave relatively to the duct.

Referring again to the drawings, when the aircraft concerned is travelling at or near supersonic speeds, it is found in a typical case that the air flow in the region of the inlet end 2 of the duct 1 is supersonic, and that several standing shock-waves are set up in the air, in that region. The position of one such standing shock-wave is indicated by the broken line 6, this particular shock-wave being found experimentally to extend across the inlet end of the duct 1, at the position indicated, when the flow of the air from the outlet end 3 of the duct, to the engine, is a desired flow such that the flow of the air reaching the entry to the compressor of the gas-turbine engine is not supersonic.

If the flow of the air from the outlet end 3 of the duct departs from the desired flow, it is found that the position of the shock-wave indicated by the broken line 6 changes. It is found that such change may be represented by angular movement of the broken line 6 about the effective pivot 7, the pivot 7 being a line extending across the upper face 8 of the duct in the direction perpendicular to the plane of the drawing.

According to the invention, three temperature-sensitive elements 9, 10 and 11 are arranged in a row along the duct 1, the row extending across the desired position 6 of the standing shock-wave, and along the direction of the air flow in the region of the position 6. The elements 9, 10 and 11 may, for example, be located adjacent to one or other side faces of the duct, so as to project towards the centre of the duct. Each temperature-sensitive element is arranged to give an electrical output signal which is a function of the temperature of the air at the position of that element. Thus, the element 9 is arranged to respond to the temperature of the air upstream of the desired position 6 of the standing shock-wave, the element 11 is arranged to respond to the temperature of the air downstream of the desired position 6, and the element 10 is located substantially at the desired position 6, to respond to the temperature of the air at the desired position of the shock-wave. With this arrangement, the output of the element 11 will, when the shock-wave in question is at the desired position 6, indicate a higher temperature than that indicated by the output of the element 9, while the output of the element 10 will indicate a temperature intermediate the other two temperatures.

In order to control the flow of the air through the duct 1 in accordance with the position of the standing shock-wave, the electrical output signals of the temperature-sensitive elements 9 and 11 are supplied to an averaging device 13 of generally known form. The averaging device 13 is arranged to supply, at its output, a first electrical output signal which is a function of the means of the temperatures indicated by the elements 9 and 11, and this electrical output signal is supplied to one input of a three-input subtracting device 14 of generally known form. A second electrical output signal from the temperature-sensitive element 10 is supplied to another input of the substracting device 14, and the substracting device 14 acts to subtract the first electrical output signal from the second electrical output signal to form an error signal of which the magnitude and sinse respectively indicate the degree of, and the direction of, any departure of the standing shock-wave from the position 6. As described below, a negative feedback signal provided over a line 17 is supplied to the remaining input of the subtracting device 14, and the device 14 subtracts the negative feedback signal from the error signal to form a resultant signal which is supplied to and amplified by an amplifier 15, and is then supplied to a motor 16 arranged, in response to the amplified signal, to open or close the vent 4, and thereby to tend to change the flow of the air through the duct 1 in the sense to tend to restore the standing shock-wave to the position 6. The motor 16 may have any suitable form and may, for example, be an electro-mechanical or an electro-hydraulic motor.

In order to stabilize the system, the output of the amplifier 15 is also returned, over a negative-feedback line 17 of generally known form, to the third input of the subtracting device 14. The feedback line 17 may provide simple proportional feedback (i.e., position feedback), or may be arranged to provide a combination of proportional and derivative feedback (i.e., a combination of position and rate feedback); in either case, the arrangement is of generally known form.

It is believed that the operation of the arrangement of the drawing will be substantially clear, from the preceding description. Thus, briefly, if the flow of air from the outlet end 3 of the duct 1, to the compressor, deviates in one sense from the desired flow, then the standing shock-wave will deviate from the desired position 6 and tend to retreat within the duct 1. The temperature indicated by the output signal of the temperature-sensitive element 10 will therefore tend to fall while the temperatures indicated by the sensors 9 and 11 will tend to remain constant, whereby said first electrical output signal acts as a temperature datum. The control circuit will respond to this change in the output signal, of the element 10 so as to tend to close the vent 4, this action tending both to restore the shock-wave to the desired position 6 and also to return the flow of the air to the compressor, to the desired flow. Conversely, if the flow of the air to the compressor deviates in the opposite sense from the desired flow, then the standing shock-wave will tend to move in the relatively opposite direction, and will automatically tend to be restored, by the control circuit, to the desired position 6, whereupon the flow of the air to the compressor will also tend to return to the desired flow.

It is known to measure the pressure of the air flowing through the air intake of an aircraft engine, in order to detect the position of a sanding shock-wave in the air in or adjacent to the air intake, and to control the flow of the air through the air intake in accordance with such pressure measurement, in order to maintain the shock-wave in a desired fixed position relatively to the air intake and thereby to maintain a predetermined flow of air to the engine. The disadvantages of the arrangement are, firstly, that pressure-sensitive elements are relatively large compared with temperature-sensitive elements: thus, only one pressure-sensitive element can generally be inserted into the air intake, while a larger number of the smaller temperature-sensitive elements can be inserted, giving the possibility of greater sensitivity to deviations of the shock-wave from the desired fixed position. Secondly, temperature differences can be sensed more easily than pressures. Thirdly, where the temperature-sensitive elements provide electrical output signals, such signals can be transmitted to the control means with a relatively small time lag compared with the time lag associated with pressure measurement.

In a modification of the invention which has been described with reference to the drawing, the gas need not be air. Thus, in particular, it is contemplated that the invention may have application to the control of the flow of exhaust gases from an aircraft engine and through an exhaust duct into the atmosphere, according to the position of a standing shock-wave associated with that flow.

The invention has application to the control of the flow of a gas to or from engines other than the aircraft gas-turbine engine specifically referred to.

The invention, in general, has application to the control of the flow of a gas relatively to an object past which the gas is flowing, the control being carried out in accordance with the position of a standing shock-wave associated with that flow.

In general, any suitable number of the temperature-sensitive elements may be employed, to respond to deviations of a standing shock-wave from a desired position. The temperature-sensitive elements are preferably arranged in at least one row, each row extending across the desired position of the shock wave and in the direction of flow of the gas concerned, and one of the elements in each row being preferably located substantially at the desired position of the shock-wave.

The invention is, further, not limited to the case where the control means controls the vent 4, or to the more general case where the control means controls a variable aperture by which air can escape to the atmosphere, but may have any suitable form which will permit appropriate modification of the flow of the gas concerned relatively to the object concerned.

I claim:

1. In combination with a duct carrying a gas flow in a selected one of the directions to and from an engine and modifying means for modifying the geometry of said duct to thereby adjust the position of a standing shock-wave existing within said gas flow within said duct for a range of high speeds of said gas flow, sensing means responsive to the departure of said standing shock-wave from a desired position relative to said duct to derive an error signal representing said departure, and control means responsive to said error signal and arranged to control said modifying means in the sense to tend to restore said standing shock-wave to said desired position, said sensing means including at least three temperature-sensitive elements located within said gas flow, one of said temperature-sensitive elements being located substantially at said desired position, at least one other of said temperature-sensitive elements being located at one side of said desired position, and at least one other of said temperature-sensitive elements being located at the other side of said desired position, and said sensing means including comparison means for combining the output signals of said temperature-sensitive elements to derive said error signal.

2. Apparatus according to claim 1, wherein said temperature-sensitive elements are arranged in a row, so as to extend across said desired position in the direction of said gas flow.

3. Apparatus according to claim 1, wherein said comparison means includes means for combining the output signals of said other temperature-sensitive elements to form a resultant output signal and means for comparing said resultant output signal with the output signal of said one temperature-sensitive element to thereby derive said error signal.

4. In combination with a duct carrying a gas flow in a selected one of the directions to and from an engine and modifying means for modifying the geometry of said duct to thereby adjust the position of a standing shock-wave existing within said gas flow within said duct for a range of high speeds of said gas flow, sensing means responsive to the departure of said standing shock-wave from a desired position relative to said duct to derive an error signal representing said departure, and control means responsive to said error signal and arranged to control said modifying means in the sense to tend to restore said standing shock-wave to said desired position, said sensing means including three temperature-sensitive elements arranged in a row so as to extend across said desired position in the direction of said gas flow, one of said temperature-sensitive elements being located substantially at said desired position and the other of said temperature-sensitive elements being located respectively at opposite sides of said desired position, said sensing means also including an averaging device supplied with the output signals of said other temperature-sensitive elements and arranged in response to generate a resultant output signal which is a function of the mean of the temperatures sensed by said other temperature-sensitive elements, said sensing means further including a subtracting device supplied with said resultant output signal and the output signal of said one temperature-sensitive element to thereby derive said error signal.

5. Apparatus according to claim 1, wherein said modifying means comprises a vent carried by said duct and capable of being opened to provide communication between the interior of said duct and the atmosphere surrounding said duct.

6. Apparatus according to claim 5, wherein said control means includes a motor driven in response to said error signal and operably arranged to open and close said vent.

7. Apparatus according to claim 6, wherein said motor is an electro-mechanical motor.

8. Apparatus according to claim 6, wherein said motor is an electro-hydraulic motor.

9. Apparatus according to claim 1, wherein said control means includes amplifying means arranged to amplify said error signal and provided with a stabilising feedback circuit extending from the output to the input of said amplifying means.

10. In combination with an aircraft having a duct arranged to supply air to an engine of said aircraft and modifying means for modifying the geometry of said duct to thereby adjust the position of a standing shock-wave existing within said air within said duct for a range of high speeds of the flow of said air, sensing means responsive to the departure of said standing shock-wave from a desired position relative to said duct to derive an error signal representing said departure, and control means responsive to said error signal and arranged to control said modifying means in the sense to tend to restore said standing shock-wave to said desired position, said sensing means including at least three temperature-sensitive elements located within said gas flow, one of said temperature-sensitive elements being located substantially at said desired position, at least one other of said temperature-sensitive elements being located at one side of said desired position, and at least one other of said temperature-sensitive elements being located at the other side of said desired position, and said sensing means including comparison means for combining the output signals of said temperature-sensitive elements to derive said error signal.

References Cited by the Examiner

UNITED STATES PATENTS

| | | | |
|---|---|---|---|
| 2,829,490 | 4/1958 | Kresse | 60—35.6 |
| 2,971,329 | 2/1961 | Barry | 60—35.6 |
| 2,995,320 | 8/1961 | Gottschalk | 60—35.6 |

MARK NEWMAN, *Primary Examiner.*

RALPH D. BLAKESLEE, *Examiner.*